Dec. 28, 1926.
T. MIDGLEY
1,611,927
PREPARING BIAS CUT LAMINATED STRIPS
Filed Dec. 8, 1924
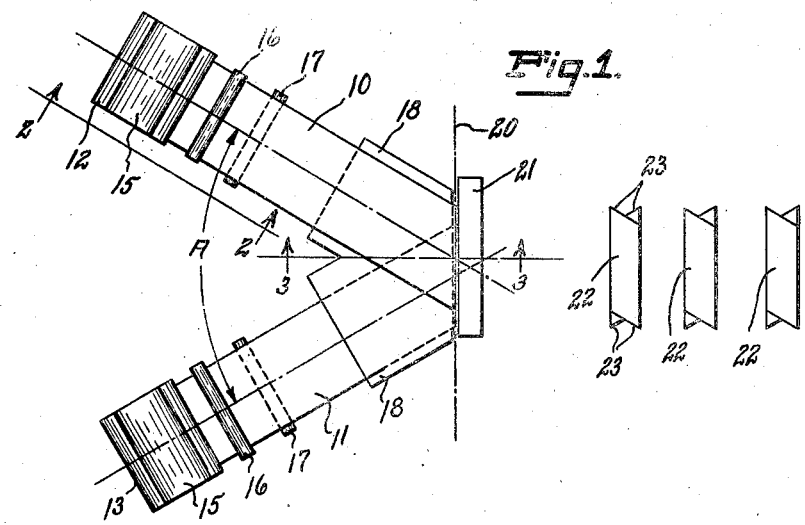
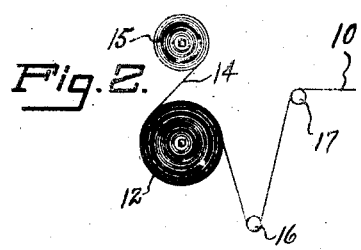
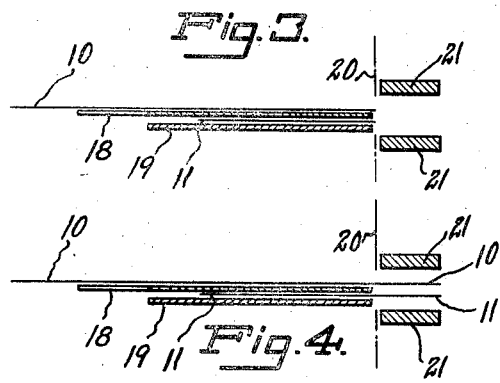
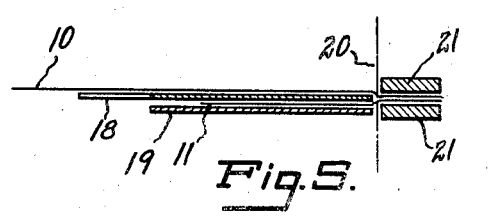
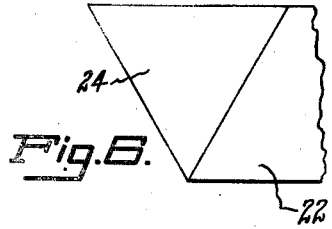
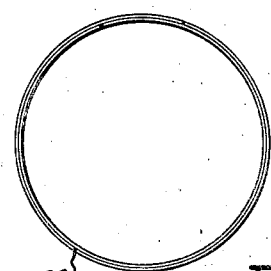
INVENTOR.
Thomas Midgley
BY
Ernest Taylor
ATTORNEY.

Patented Dec. 28, 1926.

1,611,927

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

PREPARING BIAS-CUT LAMINATED STRIPS.

Application filed December 8, 1924. Serial No. 754,522.

This invention relates to the production of bias-cut laminated strips, such for example as are used in the building of automobile tires of the cord type. Such strips have customarily been made by cutting single ply strips on the bias from a wide strip, and carrying the single strips to an operator who, with the aid of a drum or revolving board, built up two ply endless bands. It is the object of this invention to form at one operation from the original wide strips a two ply bias strip ready to be made into an endless band by a simple joining of its ends.

Referring to the drawings—

Fig. 1 is a diagrammatic plan view illustrating my improved method;

Fig. 2 is a side elevation on line 2—2 of Fig. 1;

Fig. 3 is a section on an enlarged scale, on line 3—3 of Fig. 1;

Fig. 4 is similar to Fig. 3, but shows a later stage in the method;

Fig. 5 is a similar view showing a still later stage;

Fig. 6 is a detail of a laminated strip showing an alternative construction; and Fig. 7 is a side elevation of a band formed by lapping the ends of a band so prepared.

In Fig. 1, 10 and 11 are webs of material, usually of the so-called cord fabric which is used for the manufacture of tire casings, supplied on rolls 12 and 13. As the material is rubberized at the time it is cut its successive layers are separated by a liner 14 to keep the rubber surfaces from adhering together. This liner is wound up on a roll 15, one being supplied for each web. The webs are each led under a slack or compensating roll 16 and over a guide roll 17 to the cutting and laminating apparatus.

It will be clear from Fig. 1 that the two webs are arranged at an angle to each other, the angle being represented by A. This angle can be varied, depending on the angularity which it is desired that the cords should have in the strips which are to be cut. Furthermore, by placing the two webs at unequal angles with relation to the cutting apparatus, the angularity of the cords in the two plies of the laminated sheets may be made unequal. Web 10 passes over a separating guide 18, while web 11 passes under it, this keeping the two webs out of contact with each other at all times prior to cutting.

An underlying guide 19 may be used to prevent sagging of web 11. As they pass respectively over and under the guide 18 the webs cross each other, being pushed or drawn out so that they extend beyond guide 18 a distance sufficient to permit strips of the width desired being cut off. This condition is illustrated in Fig. 4. When the desired position of the superposed webs has been attained they are severed simultaneously along the line 20. While the cutting and the consequent falling of the top cut-off strip on the bottom one may cause the two strips to adhere sufficiently at least for purposes of transportation away from the cutting device, it is preferred to press the strips together at the same time that they are cut off from their respective webs. This can be done by press members or clamps 21 which, as appears from Figs. 3 and 4, are normally separated, but which close together as in Fig. 5 at the time of the cut.

One form of laminated strip, adapted for what is known as a fish-tail joint, appears in the severed laminated strips 22, shown at the right in Fig. 1. In this form the crossing-points of the ends of the strips lie midway across the strips, producing two triangular single-ply projections 23 at each end. If one of these strips is bent into circular form, as in Fig. 7, these single-ply projections can be interfitted and adhesively secured together by means of the rubber with which the material is coated, so that a complete ring of uniform two-ply thickness results. An alternative form of strip is illustrated in Fig. 6, which shows one end only. In this case the strips cross each other at one edge of the composite strip, forming only one single ply portion 24 at each end. When lapped into endless form as in Fig. 7 this type also gives a double ply band of uniform thickness. In order to produce one form or the other, or any intermediate form, it is necessary only to vary the relative positions of the webs in the direction of the length of line 20.

Having thus described my invention, I claim:

1. A method of making laminated material for use in tire building which comprises moving two webs of rubberized material angularly over one another without contact one with the other until portions of the two strips are superposed, pressing together the superposed portions of the webs, and severing the superposed portions of the webs substantially coincidentally with the pressing operation, whereby a two-ply strip will be produced having the strain-resisting members of its plies crossing and having single ply end portions adapted to be lapped upon one another to facilitate splicing.

2. A method of making laminated material for use in tire building which comprises moving two webs of rubberized material progressively in angularly disposed superposed paths whereby the leading end portions of the webs are caused to lie one over the other but without contact, intermittently pressing the leading end portions of the webs so superposed into contact with each other, and substantially coincidentally with each pressing operation severing the superposed portions of the webs, whereby there will be produced a succession of two-ply strips having the strain-resisting members of their plies crossing and having single ply end portions adapted to be lapped upon one another to facilitate splicing.

THOMAS MIDGLEY.